Dec. 1, 1931.  G. T. RONK  1,834,222
CLUTCH CONTROL DEVICE
Filed April 16, 1928
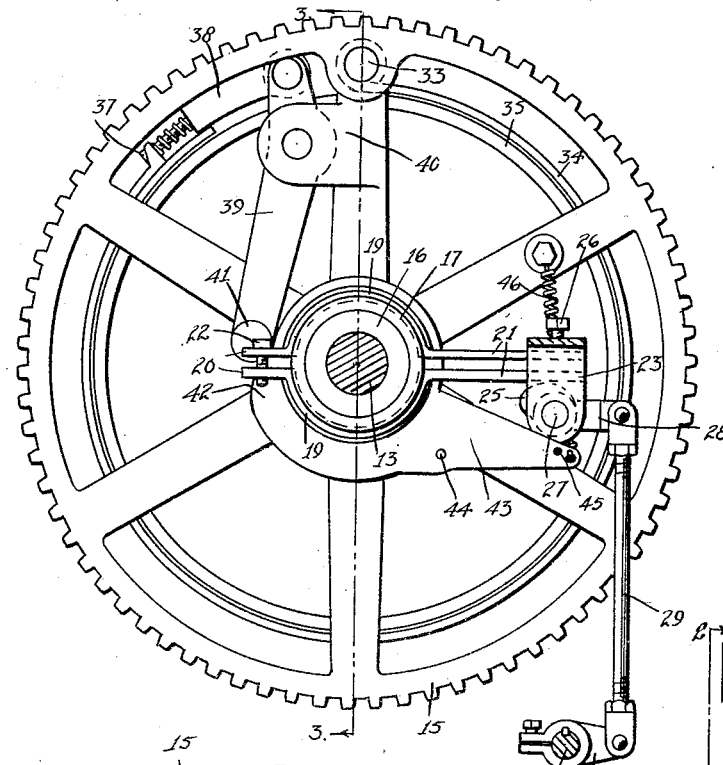
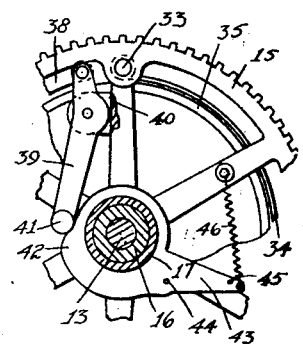
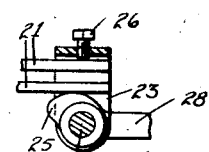
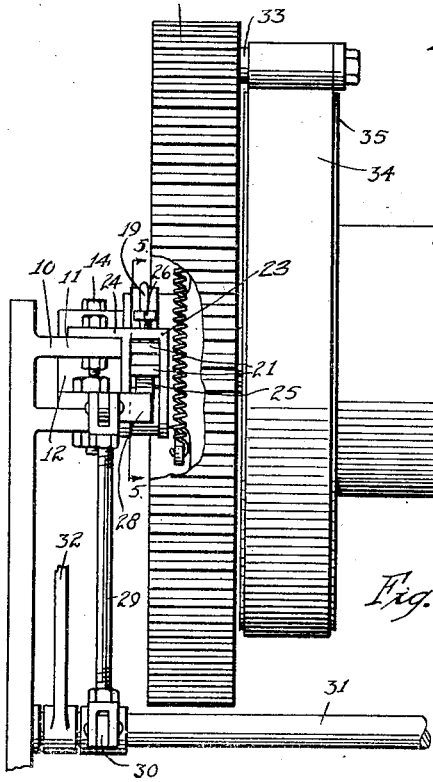
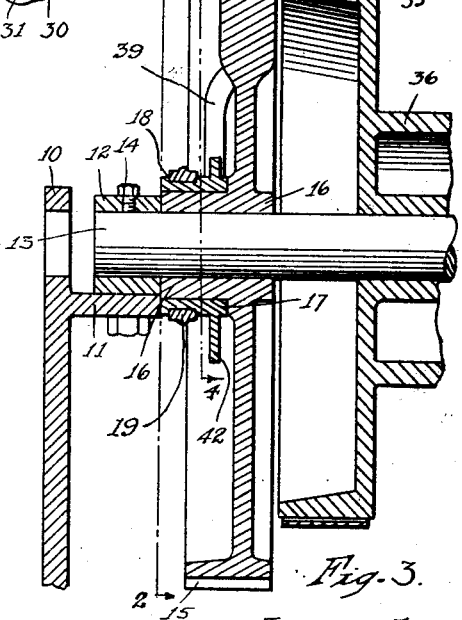
Inventor.
George T. Ronk
by Orwig & Hager, Atty's Patented Dec. 1, 1931

1,834,222

UNITED STATES PATENT OFFICE

GEORGE T. RONK, OF CEDAR RAPIDS, IOWA

CLUTCH CONTROL DEVICE

Application filed April 16, 1928. Serial No. 270,325.

The object of my invention is to provide a clutch mechanism of simple, durable and inexpensive construction, especially designed to be used in connection with cable drums of the kind used on ditching machines and hoists; and provided with means whereby the clutch for throwing the drum into and out of operation with its driving member may be mechanically operated through a second manually controlled brake member.

More specifically it is the object of my invention to provide in connection with a cable drum improved means for throwing the drum into operative relation with a driving gear, said device being provided with manually controlled mechanism and a power clutching mechanism so arranged that the power clutching mechanism will be actuated through power derived from the driving element.

My invention consists in the construction, arrangement and combination of the various parts of the device, whereby the objects contemplated are attained, as hereinafter more fully set forth, pointed out in my claim, and illustrated in the accompanying drawings, in which:

Figure 1 is a side elevation of my improved clutch mechanism showing the manner in which it is applied to the driving gear and a cable drum supported adjacent to said gear.

Figure 2 is a detail sectional view taken on the line 2—2 of Figure 3.

Figure 3 is a detail sectional view taken on the line 3—3 of Figure 2.

Figure 4 is a detail sectional view taken on the line 4—4 of Figure 3.

Figure 5 is a detail sectional view taken on the line 5—5 of Figure 1.

Referring to the accompanying drawings, I have used the reference numeral 10 to indicate a supporting frame having inwardly extending flange 11 on which is supported a bearing 12, in which a shaft 13 is mounted and supported against rotation by means of a set screw 14. Only one end of the shaft 13 is illustrated on which my improved mechanism is mounted. The other end of said shaft is supported by a bearing member similar to the bearing 12.

The shaft 13 is provided with a gear wheel 15 having a hub 16. The outer end of the hub 16 is machined and provided with a sleeve 17 rotatively mounted on said hub. The outer end of the sleeve 17 is provided with a peripheral groove 18 in which is mounted a two-piece collar 19. Said collar members are provided with forwardly extending flanges 20 and rearwardly extending flanges 21. The flanges 20 are provided with a set screw 22, while the flanges 21 are mounted in a yoke 23.

The said yoke 23 is supported by means of a bracket 24 mounted on the frame member 10, as clearly illustrated in Figure 1. The parts are so proportioned that the said flanges 20 and 21 are supported a slight distance apart as illustrated in Figure 2.

A cam 25 is pivotally mounted in the yoke 23 and designed to engage the lower one of the members 21, while the upper one of said members 21 is designed to rest against a set screw 26 supported in the closed end of the yoke 23.

The cam 25 is supported in the yoke by means of a pivot 27. The said cam is provided with an arm 28 to which a vertically arranged link 29 has its upper end connected, the lower end of the link being pivoted to a rock arm 30 supported on the rock shaft 31. Said shaft 31 is provided with a vertically arranged operating lever 32, the upper end of which is broken away as illustrated in Figure 1.

The gear wheel 15 is provided with a laterally extending pin 33 for supporting one end of a clutch band 34 supported around the drum 35 carried by one end of the cable drum 36. Said cable drum is rotatively mounted on the shaft 13.

The opposite end of the band 34 is supported by means of a rod or bolt 37 carried in a block 38 pivotally connected in one end of an arm 39. The said arm 39 is pivotally connected to one spoke of the gear 15 by means of a suitable bracket 40. The inner end of the arm 39 is provided with a lug or roller 41 designed to be supported on a cam 42 carried by the inner end of the sleeve 17.

The sleeve 17 is also provided with an arm 43 designed to rest adjacent to another one of the spokes of the wheel 15. The said arm 43 has laterally projecting pins 44 and 45 for receiving the last said spoke of the gear wheel 15 between them.

The said pins 44 and 45 are spaced so that the arm 43, the cam 42 and the sleeve 17 may be rotated relative to the gear 15 a slight distance. The pin 44 is designed to rest yieldably against the spoke by means of a spring 46 with the lug 41 of the lever 39 resting against the cam 42 in the manner clearly illustrated in Figure 4, and with the free end of the lever 39 at its inner position of movement, and with the band 34 loosely supported about the drum 35.

The collar members 19 are also loosely mounted in the groove 18 when the device is in its normal and inoperative position, with the drum 36 disconnected from the gear 15.

The practical operation of my device is as follows:

Assuming that the gear 15 is being continuously rotated by mechanism not illustrated, and the mechanism is in its normal inoperative position, and it is desired to lock the drum to the said gear, then as the gear 15 is rotated it will be seen that the sleeve 17 will also be rotated through the pin 44 and the arm 43, the said gear and sleeve being rotated in an anti-clockwise direction as viewed in Figure 2.

The operator then grasps the upper end of the lever 32 and moves it forwardly, causing the shaft 31 to be rocked and the outer end of the lever 28 to be lowered through the arm 30 and the link 29. This in turn will cause the cam 25 to be rotated in a clockwise direction, forcing the lower one of the flanges 21 upwardly and causing the members 19 to grip the sleeve 17, and the movement of the cam 42 retarded relative to the angular movement of the lug 41, against the action of the spring 46. The retarding movement of the cam 42 is limited by means of the pin 45 engaging the forward edge of the gear spoke. The retarding movement of the cam 42 will cause the inner end of the arm 39 to be moved outwardly and its upper end moved rearwardly relative to its line of travel, causing the band 34 to be tightened and to grip the drum 35, thereby locking the gear 15 and said drum 35 together.

Thus it will be seen that I have provided a clutch mechanism adapted to frictionally lock a rotary driving element to a rotary driven element in such a manner that the clutch mechanism may be operated by a comparatively small amount of power applied manually, thereby providing means whereby heavy and powerful mechanism may be easily and efficiently operated. The set screws 22 and 26 provide means for adjusting the members 19 for taking up wear.

I claim as my invention:

A clutch control mechanism including a supporting shaft and a yieldably and rotatively mounted cam collar for actuating clutch devices, means for retarding the rotation of said collar, the last said means comprising a two-piece collar having one set of its corresponding ends connected together and the other ends provided with laterally projecting flanges to form levers, the free ends of said levers being mounted in a yoke, a set screw in the bight of said yoke for engaging one of said lever devices, a cam also mounted between the arms of said yoke for engaging the free end of the other lever device, whereby rotation of said cam will cause the free ends of said levers to be squeezed together and the two-piece collar to clamp the first collar, and manually operated lever devices for rotating the last said cam.

Des Moines, Iowa, April 6, 1928.

GEORGE T. RONK.